Oct. 15, 1963  A. B. LAKEY ET AL  3,107,130
BEARING LUBRICATING MEANS
Filed Sept. 8, 1961

INVENTORS
ARTHUR B. LAKEY
JULIAN F. SPIEGEL
BY
Cameron, Kerkam + Sutton
ATTORNEYS United States Patent Office 3,107,130
Patented Oct. 15, 1963

3,107,130
BEARING LUBRICATING MEANS
Arthur B. Lakey and Julian F. Spiegel, Philadelphia, Pa.;
Edna S. Lakey, executrix of said Arthur B. Lakey,
deceased, assignors to Kingsbury Machine Works, Inc.,
Philadelphia, Pa., a corporation of Delaware
Filed Sept. 8, 1961, Ser. No. 136,761
3 Claims. (Cl. 308—127)

This invention relates to lubricating means for bearings, particularly journal bearings or the like for relatively horizontal shafts.

It has been proposed heretofore to lubricate bearings of the above type by means of ring oilers rotatably suspended on the shaft and dipping into a body of oil below the shaft but such ring oilers do not operate satisfactorily with shafts rotating at high speed because of slippage between the ring and the shaft.

It has also been proposed to lubricate such bearings by the use of a disc rotating with the shaft and dipping into a body of oil below the shaft, together with means associated with the disc to remove the oil therefrom at a suitable point for transfer to the part to be lubricated. An example of such disc oiling means is found in the prior patent of Arthur B. Lakey, No. 2,357,410, relating particularly to scraping means for removing the oil from the disc. Such disc oiling means are very satisfactory, except again in connection with shafts rotating at fairly high speeds in which case a large part of the oil may be thrown clear of the disc by centrifugal force before reaching the scraping means.

It is an object of this invention to provide novel bearing lubricating means of the oiling disc type that will assure an adequate supply of lubricant to the journal or other bearing regardless of the speed of rotation of the shaft.

Another object of the invention is to provide disc oiling means of the type characterized above which are associated with the shaft in such a way that the speed of rotation of the disc does not substantially exceed a predetermined value, despite higher speeds of the shaft itself.

Another object is to provide disc oiling means of the type characterized above which are of simple construction, inexpensive to manufacture and install, and yet reliable and certain in operation.

With the foregoing objects in view, the present invention provides oiling disc means in the form of a plurality of segments or sections which can be assembled in disc-like formation around the shaft, said segments or members being interconnected and held in assembled disc formation by means yieldable in response to centrifugal force exerted thereon by said members. By way of example, said members may each comprise a segment of the total circumference of the disc, the sections being arranged end to end to complete the disc-like assembly and being interconnected by suitable means permitting the segments to move radially outward relative to the shaft in response to centrifugal force. As an example, a plurality of segments each forming part of a complete circumference are interconnected end to end by resilient means. At predetermined speeds of the disc assembly, the centrifugal force exerted by the individual segments causes these resilient connections to yield and thus permits radial displacement of the sections relative to the shaft.

It will be understood that at low shaft speeds, as when the shaft is just starting to rotate, the disc assembly will be held in fairly tightly clamped relation with the shaft so as to rotate therewith without any lost motion, the arrangement at this time operating essentially like the disc oiling means disclosed in the aforesaid Lakey patent.

As the speed of the shaft increases to a predetermined value, say 200 r.p.m., such that any increase in the speed of the oiling disc assembly would result in excessive throw-off of oil, the resilient or other yieldable connections between the segments are pre-set to yield and permit radially outward displacement of the segments so as to break the driving engagement of the disc assembly with the shaft. Lost motion can then take place with the shaft rotating inside the disc assembly at a higher speed than the disc assembly. An oil film will be established in such cases between the shaft and the disc assembly, so that the assembly will continue to rotate by virtue of the drag of the viscous oil film, but at a lower speed than the shaft. In this way the maximum speed of rotation of the disc assembly is limited to a predetermined value in spite of increases of speed of rotation of the shaft itself above this value.

In normal operation of such a bearing and lubricating means, there will be fairly steady rotation and the disc assembly will be maintained in a relatively stable position of displacement relative to the shaft. When the shaft speed is only slightly greater than the desired maximum speed of the disc assembly, the sections of the assembly will be only slightly separated from the shaft and the oil film will be relatively thin. Should the shaft speed increase to and then stabilize at a higher value, the drag of the oil film may tend to increase the speed of rotation of the disc assembly above the desired maximum, but then the greater centrifugal force exerted by the segments will cause further radial separation between them and the shaft, thus increasing the thickness of the oil film. Thus the drag of the film on the disc assembly constitutes a fairly constant effective driving force to maintain the speed of rotation of the disc assembly within reasonable limits.

One embodiment of the invention has been illustrated in the accompanying drawings, but it is to be expressly understood that said drawings are for purposes of illustration only and are not to be construed as a definition of the limits of the invention, reference being had to the appended claims for this purpose.

In said drawings.

Figure 1:
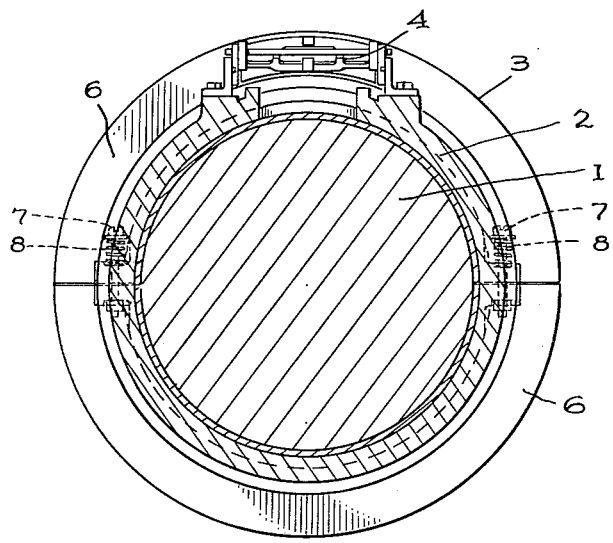
FIG. 1 is a sectional view of a horizontal shaft and journal bearing equipped with disc oiling means embodying the invention, this section having been taken on the line 1—1 of FIG. 2.
Figure 2:
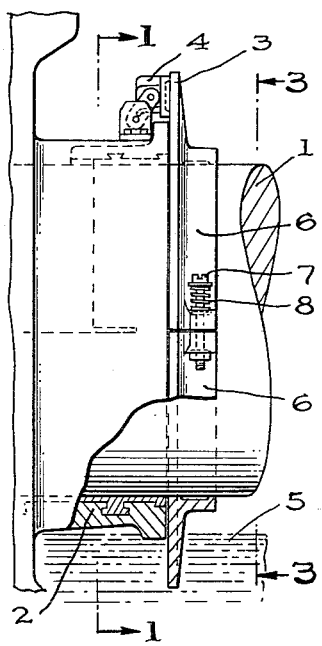
FIG. 2 is a side view, partly in section, of the shaft and disc oiling means.

In the form shown, the horizontal shaft 1 is provided with any suitable journal or other bearing 2, it being understood that the details of form and construction of the bearing and its housing constitute no part of the present invention. Associated with the bearing is a disc oiling means in the form of a multi-part disc assembly 3 of the type described above. The oil carried by the disc may be delivered to the part to be lubricated in any desired manner. As here shown, suitable oil scraping means 4 are provided at the top of the bearing; this scraping means being for example of the type disclosed and claimed in the aforesaid prior Lakey patent. As shown in FIG. 2, the disc assembly 3 dips into an oil sump 5 below the bearing and carries oil up to the scraper 4 for lubricating purposes.

In order to permit the radial displacement of the disc assembly under centrifugal force, as explained above, it is here shown as composed of two semicircular segments 6 which meet end to end at diametrically opposite points and are connected together by suitable resilient means such as the bolts 7 and coil springs 8.

It will be understood that the springs 8 are so preadjusted and pre-set that when the rotation of the shaft reaches the desired maximum for the disc assembly, said springs yield and permit the segments 6 to separate radially from the shaft. This spring adjustment will depend of course on the strength of the springs themselves, and can be varied by regulating the degree to which the bolts 7 are setup or tightened on the springs.

Figure 3:
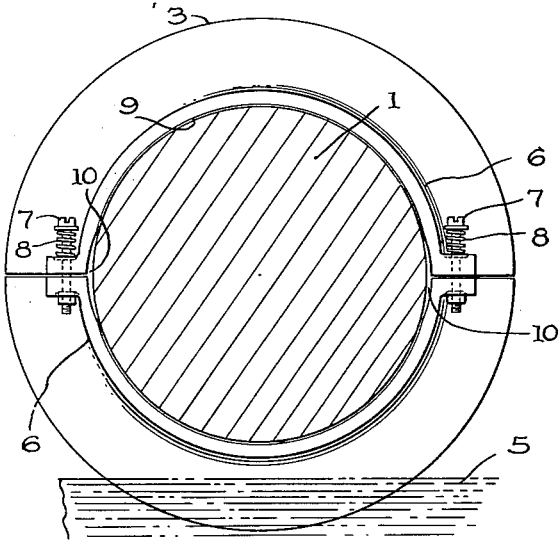
FIG. 3 illustrates the operation of the disc oiling means embodying the invention, this view having been taken on the line 3—3 of FIG. 2.

As shown in FIG. 3, such radial separation provides a small circumferential space surrounding the shaft between it and the disc assembly, which is indicated at 9. In the general operation as described above, this space will be filled with oil to provide the drag film described above. Preferably, when only two semicircular segments are employed, the ends of their semicircular surfaces are relieved slightly as indicated at 10 so as to minimize any risk of either semicircular segment gripping the shaft and tending to hang on to it in spite of centrifugal force.

The operation of the embodiment of the invention illustrated in the drawings will thus correspond to the above general description of the invention, with the result that the maximum speed of rotation of the disc assembly is maintained within limits such that the throw-off of oil is not excessive despite higher speeds of the shaft itself. It will be understood, however, that the invention is not restricted to this embodiment and that various changes can be made in the form and details of construction of the various parts without departing from its spirit.

Reference should therefore be had to the appended claims for a definition of the limits of the invention.

What is claimed is:

1. In a lubricating means of the type employing a disc rotating with a shaft and conveying lubricant from a source below the shaft to a higher position for removal of the lubricant and transfer thereof to a part to be lubricated, disc-forming members each forming part of a disc-like assembly surounding the shaft in driven relation therewith and means interconnecting and holding said members in assembled disc-like formation, the improvement comprising said means being yieldable in response to centrifugal force exerted by said members and said members thereby being displaceable radially relative to said shaft to limit the speed of rotation of said disc assembly substantially to a predetermined value.

2. In a lubricating means of the type employing a disc rotating with a shaft and conveying lubricant from a source below the shaft to a higher position for removal of the lubricant and transfer thereof to a part to be lubricated, disc-forming members each forming part of a disc-like assembly surrounding the shaft in driven relation therewith, and means interconnecting and holding said members in assembled disc-like formation clamped on said shaft for rotation therewith, the improvement comprising said means being yieldable in response to centrifugal force exerted by said members and said members being thereby displaceable radially when the speed of shaft rotation exceeds a predetermined value to release said clamping engagement.

3. In a lubricating means of the type employing a disc rotating with a shaft and conveying lubricant from a source below the shaft to a higher position for removal of the lubricant and transfer thereof to a part to be lubricated, disc-forming members each forming part of a disc-like assembly surounding the shaft, and means interconnecting and holding said members in assembled disc-like formation, the improvement comprising said means being yieldable in response to centrifugal force exerted by said members when the shaft speed exceeds a predetermined value and said members being thereby displaceable radially relative to said shaft, said assembly rotating with said shaft by reason of the drag of an interposed oil film and said radial displacement increasing as shaft speed increases to increase the thickness of said oil film.

References Cited in the file of this patent

UNITED STATES PATENTS 2,357,410     Lakey _____ Sept. 5, 1944